June 10, 1941.   A. T. McWANE   2,245,154
SEPARATION RESISTING PIPE JOINT
Filed May 4, 1939   2 Sheets-Sheet 1
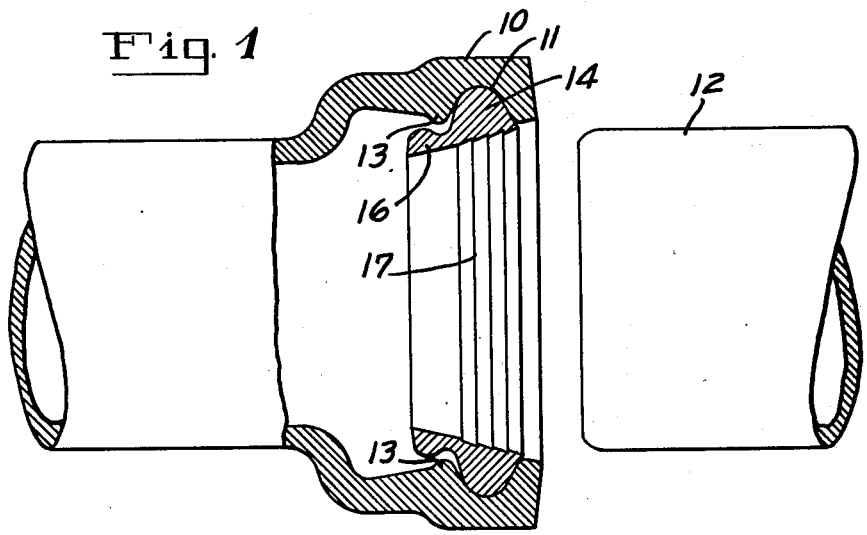
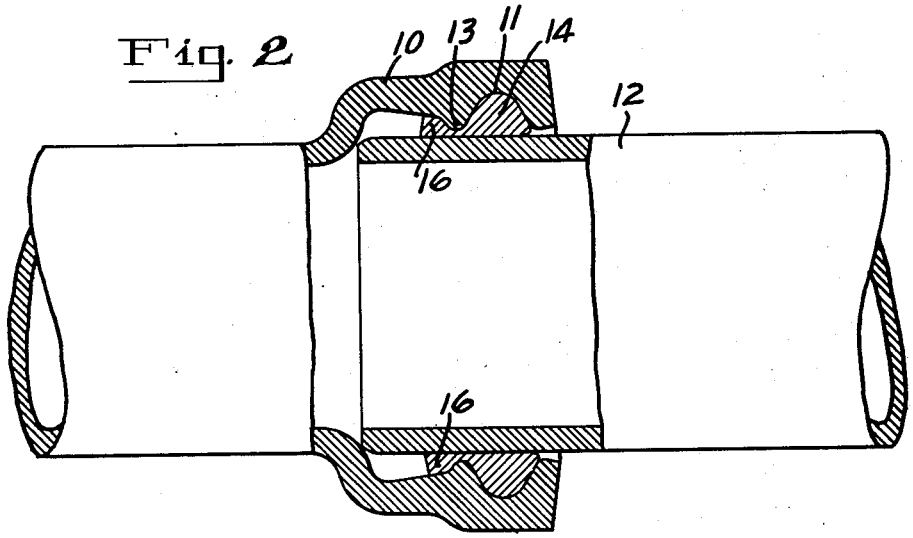
INVENTOR
ARTHUR T. McWANE
BY
Johnston & Jennings
ATTORNEYS

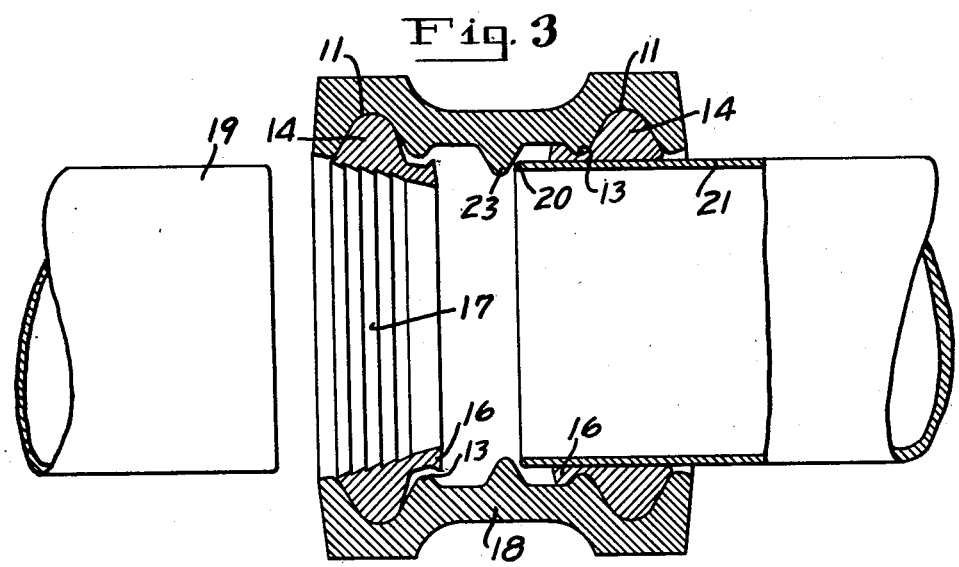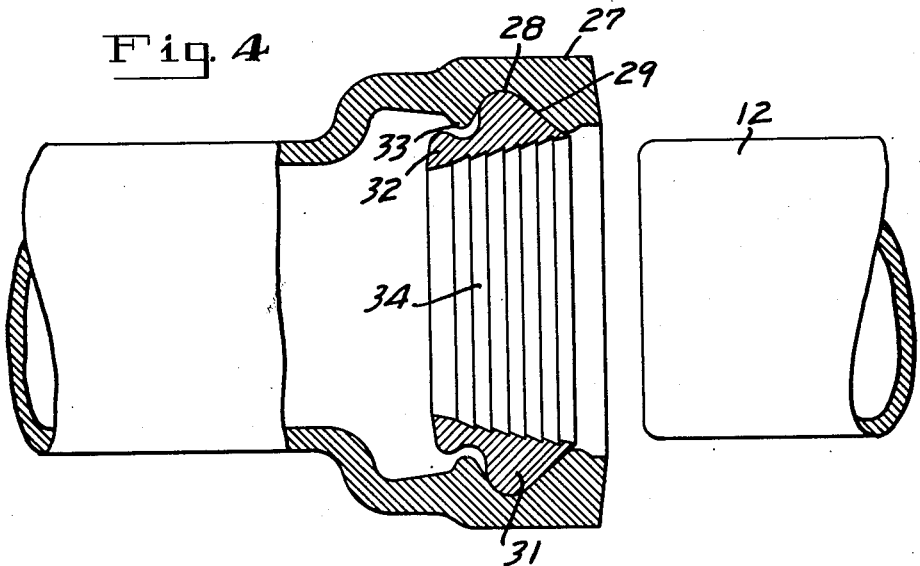

Patented June 10, 1941

2,245,154

UNITED STATES PATENT OFFICE 2,245,154

SEPARATION RESISTING PIPE JOINT

Arthur T. McWane, Birmingham, Ala.

Application May 4, 1939, Serial No. 271,634

1 Claim. (Cl. 285—90)

This invention relates to pipe joints, particularly to a joint for bell and spigot pipe, fittings and couplings, and has for its principal object the provision of such a joint which may be readily assembled without the use of glands, bolts, or other fastening devices than the mere insertion of the spigot or plain end into the bell of the pipe, or the couplings, and which shall be capable of withstanding high internal pressures and of resisting separation by reason of the internal pressure in the pipe acting against the end of the spigot.

A further object of my invention is the provision of a gasket for a bell and spigot type pipe joint or coupling which shall be composed of rubber or similar elastic resilient substance and which shall include means for resisting separation of the bell and spigot after the same are assembled.

A further object of my invention is the provision of a separation resisting pipe joint for bell and spigot type pipe, couplings, and fittings which shall comprise a bell or coupling having an arcuate groove therein with flaring sides and a gasket fitting in the groove, the gasket having a clamping ring integral therewith extending inwardly of the bell or coupling on the high pressure side thereof, and which passes around a locking ridge formed in the bell or coupling adjacent the groove on the high pressure side, the clamping ring of the gasket being tightly pressed against the locking ridge adjacent the groove.

A still further object of my invention is to provide a pipe joint for bell and spigot or coupling pipe and fittings which shall comprise a bell or coupling and a cooperating spigot or plain end member, the cooperating spigot or plain end member fitting within the bell with relatively close clearance, there being merely enough clearance to provide for ready insertion of the spigot or plain end member, and the gasket fitting in an arcuate annular groove in the bell or coupling adjacent the open end thereof, the groove having a locking ridge adjacent the high pressure side thereof, and the gasket having a clamping ring extending inwardly of the bell over the locking ridge which is pressed tightly against the locking ridge upon insertion of the spigot or plain end to lock the bell or coupling in assembled relation with the spigot or plain end.

In my prior Patent No. 2,146,641, issued February 7, 1939, there is described and claimed a pipe joint for bell and spigot pipe comprising a rubber gasket which is substantially completely confined by the surrounding walls of the bell and the cooperating spigot end of the connecting pipe, so that the gasket is under a maximum of compression and withstands a maximum of internal pressure against leakage. While the joint described in my patent aforesaid has been eminently successful in withstanding high pressures against leakage, it has required staying means to withstand separation against exceptionally high pressures. This is due to the action of the internal pressure against the end of the spigot as against a piston to force it out of the bell end of the pipe. I have discovered that a gasket and joint may be so designed as to embody all of the pressure withstanding features of my prior patent, and at the same time withstand or resist separation of the bell and spigot even better than the well known gland type joint which is assembled with gland bolts and nuts to draw the packing tightly against the spigot end of the pipe.

Briefly, my invention comprises a coupling or bell and cooperating spigot, the coupling or bell having an annular groove near the end thereof which is preferably arcuate in cross section at the bottom and which has a ridge or shoulder closely adjacent the inner or high pressure side thereof, the shoulder being rounded off to coact better with the gasket. Fitting within the groove is a rubber gasket which snugly fits the groove and is adapted to be compressed tightly within the groove. Formed integrally with the gasket is a locking ring which extends inwardly of the bell across the rounded shoulder. The inner surface of the gasket flares outwardly from the high pressure to the low pressure side thereof. The spigot or plain end which cooperates with the coupling or bell end of the pipe is substantially the same outside diameter as the internal diameter of the gasket at its greatest internal diameter at the low pressure side but at its smaller dimension on the high pressure side is larger in diameter than the internal diameter of the gasket, whereby when it is entered into the gasket and shoved through into the bell of the pipe, it stretches, expands, and distorts the rubber so as completely to fill the packing groove and to compress the clamping ring around the locking ridge in the coupling or bell end of the pipe. The interior surface of the gasket may be serrated to provide a better gripping surface on the spigot end of the cooperating pipe. Pipe joints constructed in accordance with my invention have withstood pressures up to 750 pounds per square inch without separation and without any other means that the gasket and the construction of the joint itself to prevent such separation.

A pipe joint constructed in accordance with my invention is illustrated in the accompanying drawings forming a part of this application, in which—

Fig. 1 is a sectional view of a pipe joint made in accordance with my invention with the parts disassembled;

Fig. 2 is a view similar to Fig. 1 with the parts assembled;

Fig. 3 is a cross sectional view showing my invention embodied in a coupling; and Fig. 4 is a view similar to Fig. 1 and showing a gasket and groove of different form.

Referring to the drawings for a better understanding of my invention, I show in Fig. 1 the bell end 10 of a pipe. Near the open end of the bell is a packing groove 11 which, as shown in Figs. 1 to 4, is arcuate in cross section at the bottom. Cooperating with the bell end of the pipe is a spigot 12 which has just sufficient clearance with respect to the bell end as to be entered readily thereinto, as may be seen in Fig. 2. Inside the bell end 10 of the pipe, on the high pressure side of the groove 11, is an annular ridge or shoulder 13 which is rounded off, as shown in the drawings.

Fitting within the groove 11 is a rubber gasket 14 which is arcuate in cross section where it fits into the bottom of the groove 11. Formed integrally with the gasket 14 is a clamping ring 16, which extends inwardly and axially of the bell, on the high pressure side, across the shoulder 13. Before entry of the spigot 12, as may be seen in Fig. 1, the packing ring 14 flares regularly from the high pressure to the low pressure side, and is of substantially the same internal diameter at its greatest internal dimension on the low pressure side as the outside diameter of the cooperating spigot but less internal diameter on the high pressure side than the outer diameter of the spigot 12, so that when the latter is entered into the bell end, in the position shown in Fig. 2, it compresses, stretches, and distorts the rubber of the gasket whereby it fills the packing groove and the clamping ring 16 is tightly compressed across the locking ridge 13 of the bell end of the pipe. The clamping ring 16, beyond the locking ridge 13, tightly embraces the spigot 12 so that if an attempt be made to withdraw the spigot it resists and tends to turn under the ridge 13. The ridge 13 prevents the inner lip 16 of the gasket 14 from turning under when an attempt is made to withdraw the spigot 12 and the result is that my improved joint will withstand extremely high pressures without separation of the bell and spigot. Pipe joints made in accordance with my invention have withstood pressures as high as 750 pounds per square inch without separation and without any other mechanical restraint than the gasket itself. Preferably, the interior surface of the gasket is serrated by providing inwardly inclined ridges thereon, as shown at 17, in order to improve its gripping action on the spigot end of the pipe.

In assembling my improved joint, it is contemplated, particularly with large diameter pipe, that a pulling jack (not shown) of the wire stretcher, or other suitable type, be employed to pull the spigot section into the bell and thereby to stretch and distort the gasket in the joint into extremely tight engagement with the spigot.

In Fig. 3 I show my invention in association with a coupling 18. The packing grooves, gaskets, and other features already described, are the same as shown in Figs. 1 and 2 and the description does not require repetition. The coupling is provided with a rib 23 intermediate its ends to aid in centering it on the spigot ends 19 and 21 of thin walled steel pipe with which it may be associated. It will be obvious, however, that the coupling may be employed with cast iron or other kinds of pipe.

My improved coupling is particularly useful in association with steel pipe, inasmuch as the steel pipe has a relatively thin wall and can not be pointed or rounded off so much as cast iron pipe, and is therefore ordinarily not easily entered into a gasket of smaller diameter than the pipe. When used with steel pipe, the end is preferably filed off round, as shown at 26, so that the spigot will not tear or damage the gasket as it enters and expands it.

Referring to Fig. 4, I show a modified form of bell end 27. In accordance with this modification, the gasket groove therein shown at 28 with the side 29 flaring at a wider angle than the sides of the groove previously described, which makes the groove much wider than as shown in the previous embodiments. The gasket 31 employed with this modification of my invention is designed to fit the packing groove 28 and is provided with a clamping ring 32 integral therewith, as in the previously described modification. Adjacent the groove 28 on the high pressure side thereof, within the bell 27, is a locking ridge 33, as previously described, and against which the clamping lip or ring 32 is adapted to be compressed when the associated spigot is entered. The type of gasket herein shown is adapted for a much longer surface contact than those previously described, and is thus adapted to resist separation against somewhat higher pressures. The interior surface of the gasket is preferably serrated, as shown at 34, similar to the gasket 14 previously described, the purpose being to increase the grip of the gasket upon the spigot end of the pipe. It will be noted that the inclination of the walls of the serrations 34 and of those previously described, is flaring from the inner side of the bell outward, the result being that when the spigot is withdrawn from the bell, there is a tendency for the rubber to shear. The resistance to shear determines, in a large measure, the strength of the joint.

The type of rubber employed in the gasket of my invention is that ordinarily employed with the well known gland type of packing joints. The rubber should have sufficient elasticity to permit its distortion, as shown and described, and sufficient strength and density to prevent its flow under high pressure. When the gasket such as described, is mounted in accordance with my invention, I have found it preferable that the inner diameter of the gasket, before the spigot is inserted, should be substantially the same diameter as the cooperating spigot at the entering point and taper back to from 0.25 to 0.75 inch smaller in diameter than the spigot at the rear or high pressure side.

It is well known in the art that numerous rubber substitutes have been produced having the same or improved properties as rubber with respect to elasticity, stretch, flow and density. It will be understood that the term "rubber" as used in this specification and in the claims, is intended to cover substitutes having properties adapting them to the uses herein described. It will also be understood that the gasket may be wholly, or partially coated, covered, or impregnated with protective substances, such as jute, duck, or asbestos, or metal, as is the practice with other rubber gaskets already employed in the art.

From the foregoing, it will be apparent that I have devised an improved packing joint for bell and spigot type pipe, fittings and couplings, which is simple of design and which is capable of withstanding separation due to internal forces against exceedingly high pressures and without any mechanical restraint other than the design of the joint and gasket itself.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claim.

What I claim is:

A joint for bell and spigot type pipe, fittings and couplings comprising a bell and cooperating spigot, the bell having an annular packing groove therein near the outer end thereof, an annular gasket fitting within the groove, said packing groove being arcuate in cross section at the bottom thereof and being defined by a wall flaring inwardly of the bell on the high pressure side and a wall flaring outwardly of the bell on the low pressure side, said last mentioned wall being flared more than the first mentioned wall whereby to extend the gripping surface of the gasket, a locking ridge in the bell adjacent the high pressure side of the gasket groove, a clamping ring formed integrally with the gasket inclined axially and radially inward of the bell across the ridge, the internal diameter of the clamping ring and gasket at its smaller dimension being less than the outer diameter of the cooperating spigot, the internal surface of the said clamping ring and gasket flaring outwardly from the high pressure side to the low pressure side of the gasket, whereby upon insertion of the spigot, the gasket is stretched, and distorted, to fill the groove completely and to compress the clamping ring against the locking ridge in the bell.

ARTHUR T. McWANE.